United States Patent
Finestone et al.

[11] Patent Number: 6,083,580
[45] Date of Patent: Jul. 4, 2000

[54] CARDBOARD AND CORRUGATED BOARD CONTAINER HAVING LAMINATED WALLS

[76] Inventors: Arnold B. Finestone, 2400 Presidential Way, West Palm Beach, Fla. 33401; Gilbert Bloch, 3349 S. Malo Ct., Palm Beach Gardens, Fla. 33410

[21] Appl. No.: 09/063,238

[22] Filed: Apr. 20, 1998

[51] Int. Cl.[7] ................................................ B32B 9/04
[52] U.S. Cl. .................. 428/34.2; 428/174; 428/182; 428/184; 428/186; 428/195; 428/198; 428/464; 229/5.81; 229/5.84
[58] Field of Search .......................... 428/34.2, 34.3, 428/535, 174, 179, 184, 185, 182, 464, 458, 186, 195, 198; 229/5.81, 5.82, 5.84; 84/DIG. 17

[56] References Cited

U.S. PATENT DOCUMENTS

| | | | |
|---|---|---|---|
| 3,697,029 | 10/1972 | Lauffer | 428/34.2 |
| 4,396,142 | 8/1983 | Lines, Jr. et al. | 229/5.82 |
| 4,900,594 | 2/1990 | Quick et al. | 428/458 |
| 5,225,256 | 7/1993 | Marano et al. | 428/34.2 |
| 5,393,582 | 2/1995 | Wang | 428/34.2 |
| 5,407,714 | 4/1995 | Laves | 428/34.2 |
| 5,505,395 | 4/1996 | Qiu et al. | 428/34.2 |
| 5,609,293 | 3/1997 | Wu et al. | 229/5.81 |
| 5,618,632 | 4/1997 | Watkins et al. | 428/34.2 |
| 5,744,205 | 4/1998 | Kawai et al. | 428/182 |

*Primary Examiner*—Rena L. Dye
*Attorney, Agent, or Firm*—Pennie & Edmonds LLP

[57] ABSTRACT

A container having walls made of a paper/plastic laminate having a cardboard core sandwiched between inner and outer face liners, wherein at least one of the face liners is comprised of a face liner laminate. The face liner laminate is composed of an exterior ply of oriented synthetic plastic film whose opposing surfaces are rendered wettable by corona-discharge treatment, and a base paper ply is cold-laminated to the film ply and adhered to the core of the board. The cardboard core may be a fluted medium of corrugated paper board, or it may be a planar stiff paper core. The invention is also directed to a structural member for use in making inexpensive furniture comprising a supporting member and a cardboard core laminated to a face liner laminate. The film ply of the laminate enhances the strength of the container or structural member and imparts water resistance thereto. Because the exposed surface of the film ply is printable, it may have decorative graphics or other printed matter applied thereto.

20 Claims, 5 Drawing Sheets

CARDBOARD AND CORRUGATED BOARD CONTAINER HAVING LAMINATED WALLS

FIELD OF THE INVENTION

The present invention relates generally to corrugated board or cardboard containers, cartons, packaging, and inexpensive furniture items formed of corrugated board, and, in particular, to a corrugated board or cardboard container or furniture item having walls made of a paper/plastic laminate which enhances the strength of the container or piece of furniture and imparts water resistance thereto.

BACKGROUND OF THE INVENTION

Corrugated board products are used extensively for a wide range of packaging applications. Thus most shipping cartons are fabricated of corrugated paper board. In its fundamental form, corrugated paper board is composed of a fluted paper core sandwiched between and bonded to inner and outer paper face liners.

Corrugated paper board is usually fabricated of natural brown-color Kraft paper, although some boards include an outer liner of white or coated paper, or other suitable material, depending on the finish desired. The choice of a finish liner must take into account that it is often the practice to label the board with printed data, or to apply decorative graphics thereto; hence the outer face liner must be receptive to printing inks. It is also desirable that the outer face liner render the board water resistant. The manner in which corrugated paper board is manufactured is described in U.S. Pat. No. 5,147,480 to Lang. In this patent the outer face liner of the board is identified as a "single liner," the face inner liner is referred to as the "double liner," while the fluted core is called the "corrugated medium."

As noted in the Lang patent, the conventional technique for manufacturing corrugated paper board makes use of a single facer unit and a double backer glue machine. In the take-off roll is fed into the unit. A web of the medium to be corrugated is drawn from another take-off roll and fed through cooperating corrugator rolls. The resultant fluted or corrugated medium has adhesive applied to hereto before it is combined with the single face liner.

Thus coming out of the single facer unit is a laminate web formed by the single face liner combined with the fluted medium. This laminate web is fed into the double backer glue machine where it is glued to a web of double liner drawn from a take-off roll.

Hence emerging from the double backer glue machine is a continuous web of corrugated paper board in which the fluted medium or core is sandwiched between and bonded to inner and outer face liners. This web immediately goes through a curing step which cures the adhesive bond between the outer face liner and the fluted medium. The corrugated paper board web is then slit, scored and cut to provide corrugated paper board having the desired carton specifications.

The structural strength and wearing properties of corrugated paper board is in part determined by the face liners. Thus when a shipping carton is made of corrugated paper board whose outer face liner is Kraft paper, this carton will not be water resistant and exposure to rain and snow in the course of shipment may weaken the carton.

Corrugated paper board is likewise used to form inexpensive furniture items, such as storage units, shelving and tables. Although these items have the advantage of being light-weight and inexpensive, they are subject to damage such as bending, creasing and tearing. When such products are used in or near an area where water is present, water damage tends to destroy the appearance, and eventually the structural integrity, of the furniture item. There is thus a need for a cardboard material that can be used to form strong structures and containers wherein the cardboard also has the ability to resist water and other fluid damage.

Plastic film may be laminated to the outside surface of the finished cardboard in order to make it water resistant and also to enhance the appearance of the cardboard, such as, for example, by the application of decorative plastic film.

The typical prior art method of laminating plastic film to corrugated paper board is to attach the film to the outer face liner of the finished corrugated paper board, during an off-line process on separate laminator equipment. That is, lamination does not take place at the "process end" of the production line where the inner and outer face liners are adhered to the fluted medium. Instead, prior art methods of applying a plastic film laminate layer wait until after the fluted core has been sandwiched between paper face liners and the adhesive holding this "sandwich" has cured. The separate steps involved in such lamination processes add greatly to the cost of the laminated product, by increasing scheduling difficulties in the manufacture of different production runs, and by producing a higher percentage of waste material. Additionally, flexible plastic film material is slippery and tends to shrink when heated, making it more difficult—and therefore more costly—to work with. Furthermore, the nature of the film may be such as to preclude printing of the outer liner with standard printing inks.

Prior art attempts to apply plastic film laminates to cardboard face liners have met with the most success by applying the laminate after the corrugated paper board has been fully formed, such as in the Lang patent. Unsuccessful attempts have been made to make outer face liners out of plastic film laminates and to apply these laminated outer face liners directly to the fluted medium. These attempts have been unsuccessful, as noted in Lang (col. 16, lines 18–25), because when the plastic film outer face liner is glued to the fluted medium, it is immediately subjected to heat and pressure in order to cure the bond between the outer face liner and the fluted medium. The heat and pressure degrade the plastic film laminate's appearance and other properties. In particular, the fresh, wet adhesive between the plastic film laminate and the fluted medium tends to cause slippage as the corrugated web enters the curing step. Slippage causes unwanted misalignment and unevenness in the surface texture of the finished product. Additionally, the heat that is applied in the curing step tends to cause the plastic film layer of the laminate to shrink.

These problems of slippage and shrinkage of the plastic film, which have not been overcome in the prior art, are addressed and resolved by this invention. Additionally, this invention addresses the need for a low-cost cardboard material that is used to form containers and other structural members that are inexpensive, light-weight, and capable of withstanding heavy loading and impact forces as well as direct contact with water and other fluids.

SUMMARY OF THE INVENTION

The present invention relates to a container having walls made of a paper/plastic laminate to impart strength and rigidity to the container and to render it capable of resisting damage due to exposure to water and other fluids. More particularly, this container has walls made of a paper/plastic laminate comprising a first paper layer having first and second surfaces, an outer face liner comprising a plastic film having first and second surfaces, wherein the first surface of the plastic film is corona-discharge treated to render it wettable and receptive to adhesives, and the corona-discharge treated first surface of the plastic film is laminated to the first surface of the paper layer with a first water-based adhesive at room temperature, a cardboard layer comprising at least one paper sheet, with the layer having first and second surfaces; and an adhesive on the second surface of the paper layer for joining that second surface to the second surface of the cardboard layer to form a laminate. By associating a plastic film with the outer face liner, the exterior surface of the container formed therefrom is capable of resisting water and other fluids. The cardboard layer may be made of corrugated cardboard having a plurality of flutes attached to an inner surface of the cardboard layer. The plastic film can be present on the outer surface of the container.

Another embodiment of the invention relates to container having walls made of the above paper/plastic laminate wherein the outer face liner forms the inside surface of the container. By forming the container with the plastic film on the inner surface, the container is protectively lined on the inside to hold items that may leak during storage or shipping. The plastic film may be biaxially oriented to further enhance the strength of the laminate.

The container may also be made out of the paper/plastic laminate as described above, wherein an additional plastic film layer is adhered to an opposite surface of the cardboard layer, so that the container has inner and outer surfaces that are resistant to fluids. When a thick corrugated layer is also used, or when the corrugated layer is comprised of multiple fluted layers, such container is adaptable for use as an inexpensive coffin.

An additional embodiment of the invention relates to a container as described above wherein the exterior surface of the plastic film is corona-discharge treated to render it wettable and receptive to inks, coatings and adhesives, so that decorative graphics and other printed matter may be applied thereto. An advantage of this structure is that it provides a container whose outer surface is made of plastic film that is not only impermeable to water but also wettable by printing inks. If desired, a second paper layer may be adhesively joined to the corona-discharge treated second surface of the plastic film with a water-based adhesive at room temperature. The exterior surface of the second paper layer may be metallized to enhance its appearance.

Another feature of the invention is that the paper/plastic laminate disclosed herein may be layered upon itself once or multiple times to provide a container with greatly reinforced strength.

A further embodiment of the invention relates to a structural member for use in making furniture. This structural member includes a supporting member and a laminate comprising the paper/plastic laminate described above. The supporting member may be comprised of particle board, corrugated paper board, sheet rock or some other type of wall board. The supporting member may be laminated to the second surface of the plastic film with a water based adhesive, and in this arrangement, the second surface of the plastic film is corona-discharge treated to render it wettable and receptive to the adhesive at room temperature. Alternatively, the paper/plastic laminate may be adhered to the supporting member by laminating the cardboard layer to the supporting member with a water based adhesive. The resulting structural member is easily formed into shapes for making different types of furniture, such as cabinets, cupboards, tables, desks, shelves, etc., at low cost. If desired, the exterior surface of the structural member may have decorative graphics applied thereto.

BRIEF DESCRIPTION OF THE DRAWINGS

Preferred features of the present invention are disclosed in the accompanying drawings, wherein similar reference characters denote similar elements throughout the several views, and wherein elements shown are not drawn to scale, and wherein.

DESCRIPTION OF THE INVENTION

Figure 1:
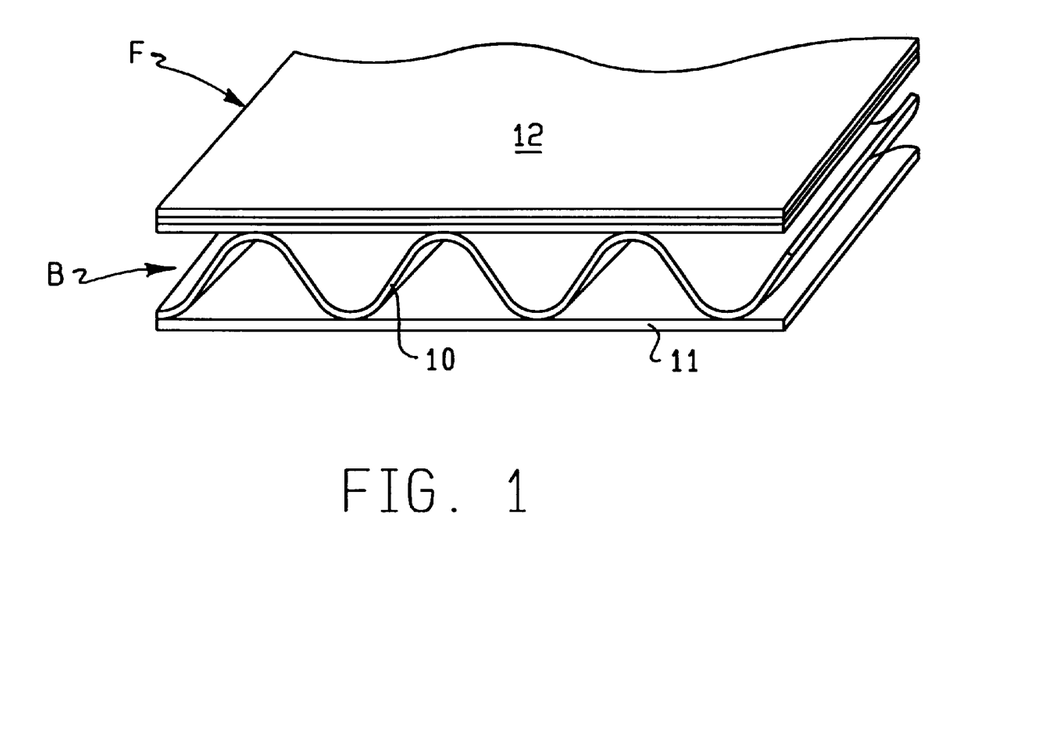
FIG. 1 is an end perspective view of a wall of a container in accordance with the invention.
Figure 2:
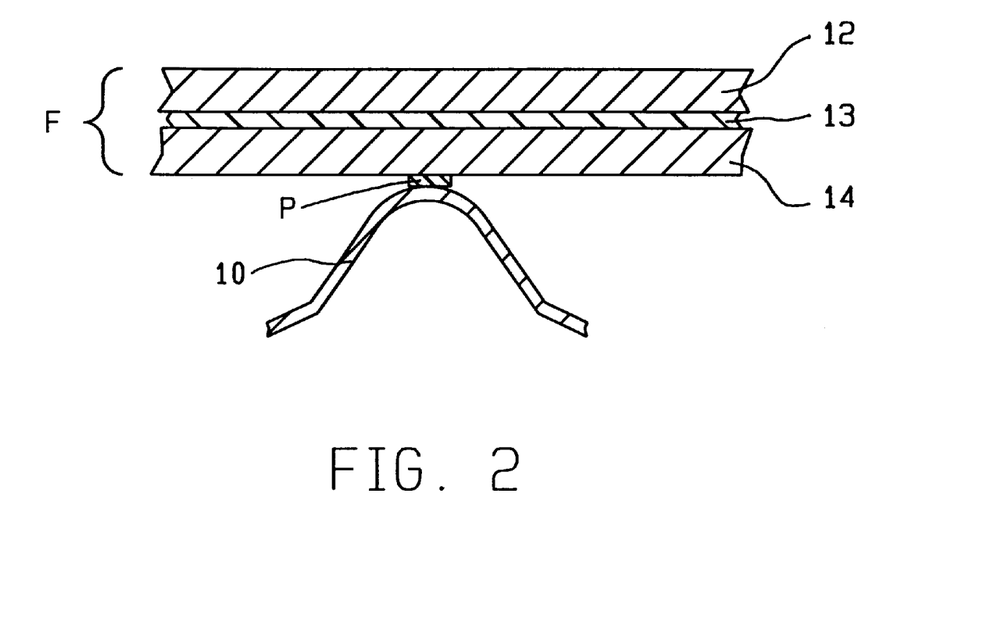
FIG. 2 is an end view of a portion of the wall of the corrugated container of FIG. 1.

FIGS. 1 and 2 show sections of a corrugated container in accordance with the invention wherein the walls of the container include a paper/plastic laminate. The corrugated board B is composed of a fluted core 10 formed by passing a web of Kraft paper through corrugating rolls in the manner described in the above-identified Lang patent. The fluted core is adhered to an inner face liner 11 of Kraft paper. An outer face liner made of face liner laminate F is then adhered to the web, thus sandwiching the fluted core between the paper inner face liner and the face liner laminate F.

The paper/plastic laminate disclosed herein may thus be manufactured on existing corrugating machinery, without substantial modification. Preferably, this invention incorporates the lamination as an integral part of the corrugation process, in the "process end" of the production line. The "process end" is the beginning part of the line wherein the core is fluted, and the inner and outer face liners are applied and adhered to opposite sides of the fluted core. In this invention, the face liner laminate may be formed at the start of the process end and is combined with a fluted web to yield a corrugated web. The corrugated web is then adhesively combined with a paper face liner web to yield a web of corrugated board having a fluted core sandwiched between laminate outer face liner F and a paper inner face liner.

It is significant that face liner laminate F may be adhered to the fluted core almost immediately after the layers of F have been laminated together, without the slippage or shrinkage of the plastic film layer that would typically be expected to accompany such a process.

An alternate method of manufacturing a container in accordance with this invention is to manufacture a web of face liner laminate F separately and then feed it into the corrugator line. Face liner laminate F is then adhesively combined to a fluted core at points P as hereinafter described.

The face liner laminate F, a portion of which is shown separately in FIG. 2, is formed by an exterior ply 12 of synthetic plastic film which is preferably oriented. Film materials suitable for this purpose are polypropylene, polyethylene, nylon or a polyester such as MYLAR. The tensile strength of a synthetic plastic film is substantially increased by orientation which results in molecular orientation of the film material. In the case of biaxial orientation, orientation is in both the longitudinal and transverse directions. This is usually effected by controlled stretching of the unoriented film.

The exterior film ply 12 is adhesively laminated by an adhesive layer 13 to a base ply 14 formed of paper. Lamination is effected at ambient temperature by a water-based adhesive, preferably a polyvinyl acetate modified copolymer composition having an affinity for both the film ply and the paper base ply. Also useable as the water-based adhesive is a polyacrylic copolymer. A water-based adhesive, when cured, is not soluble in water and cannot be remoistened.

Because the water-based adhesive is fluid at ambient temperature and is not a hot melt adhesive, no heat is applied to the biaxially-oriented film as it is being laminated to the paper ply, hence lamination is effected by cold-lamination and without affecting the properties of the oriented plastic film. It is important to bear in mind that a biaxially-oriented film is heat-sensitive, and that at elevated temperatures, the film relaxes and loses its molecular orientation and tensile strength. Cold lamination at ambient temperature is therefore essential to the present invention in order to produce a laminate of high tear and burst strength.

The lamination of oriented film to the paper ply is accomplished quickly, since the copolymer adhesive cures essentially immediately. This rapid cure time is an important feature of the process because the laminate of paper and oriented film—the face liner laminate—is adhered to the fluted core in the next step in the preferred embodiment of the invention. If the adhesive joining the film to the paper ply did not cure immediately, the film would be able slip with respect to the paper, thus creating misalignment and scuffing or wrinkling of the face liner.

There is an additional reason for the importance of having a rapid cure time for the adhesive bonding the paper and oriented film to each other. When the paper/plastic laminate is adhered to the fluted core, a starch adhesive P is typically used, and the normal process is to apply heat to the corrugated web in order to dry out the adhesive P. The heat process is preferred for removing water from the adhesive that would otherwise be trapped throughout the fluted medium which is sandwiched between the inner and outer face liners. If a face liner contains a plastic film layer, the heat process will tend to cause the film to shrink, especially if the film is not securely bonded to another layer, such as a paper layer. However, when a copolymer adhesive is used to bond the film layer to the paper layer, the adhesive cures quickly. Because the paper layer is resistant to shrinkage, it prevents the plastic film layer to which it is adhered from shrinking, even if the paper/plastic laminate is subsequently heated.

It is also to be noted that a synthetic plastic film material, such as polypropylene, is normally not receptive to adhesives, especially water-based adhesives. Hence if one were to apply to the surface of this film a water-based adhesive which is flowable at ambient but not at the elevated temperature of a hot melt adhesive, this adhesive will not be adsorbed by the film. Essential to the invention is that the opposing surfaces of the film be treated so as to render them wettable and hence receptive to adhesives, as well as to standard printing inks. To this end, these surfaces are subject to a corona discharge ionizing treatment which enhances their surface energy, as measured in dynes, and thereby renders them wettable to allow for better bonding of adhesives applied thereto. Typically, the surface energy of the synthetic plastic film material is increased to about 35 to 55 dynes for this purpose, and the increased energy material is applied with adhesive and joined to the other components before this increased energy dissipates.

The exposed surface of the paper ply 14 is adhered at points P to the crowns of the fluted paper core 10 in the same manner by which a conventional paper face liner is adhered to a fluted core 10 in a single facer unit to produce corrugated board, such as the unit for this purpose disclosed in the Lang patent.

Because the exposed surface of film ply 12 of the face liner laminate has been rendered wettable by corona discharge treatment, it is receptive to printing inks and may be decoratively or otherwise printed.

The container having walls made of this paper/plastic laminate is significantly stronger than a conventional corrugated board carton having a single fluted core, for the laminate facing greatly reinforces the carton and renders it highly resistant to scoring or gouging. If the container has flaps, they can be sealed without difficulty with conventional pressure-sensitive tape, for such tape will adhere strongly to the corona-treated plastic surface of the outer face liner laminate of the container. The exposed plastic film 12 on the outside surface of the container is impermeable to liquids, thus rendering the container water-resistant.

Alternatively, the container may be made out of the paper/plastic laminated corrugated paper board shown in FIG. 1 wherein the board is reversed, i.e., with face liner laminate F forming the interior surfaces of the container, and paper face liner 11 forming the outer surface of the container. A container formed thereby is particularly adapted for use in storing or transporting items that are subject to leakage, such as liquid-loaded containers.

Figure 3:
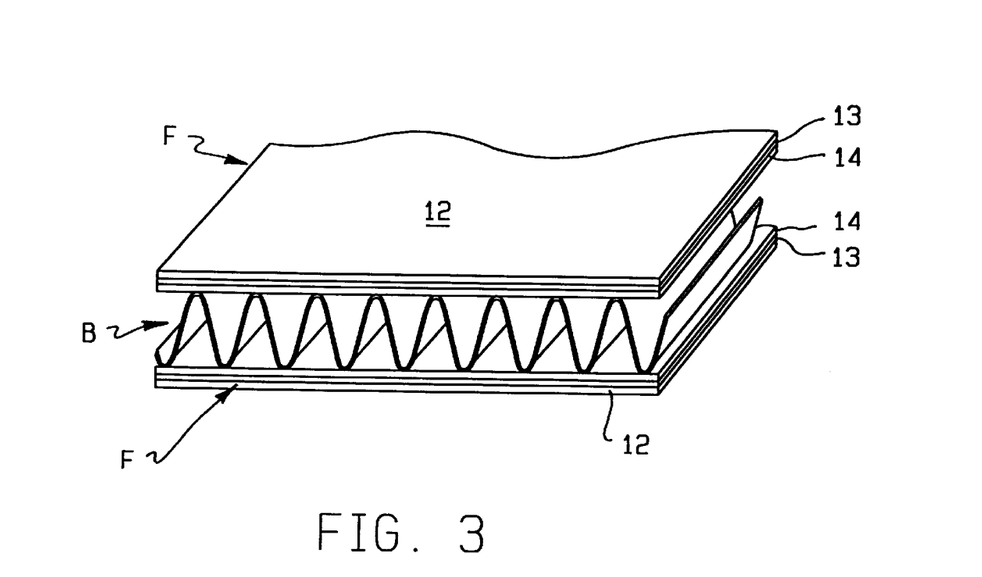
FIG. 3 is an end perspective view of a wall of an extra-strength container having large flutes in accordance with the invention.
Figure 4:
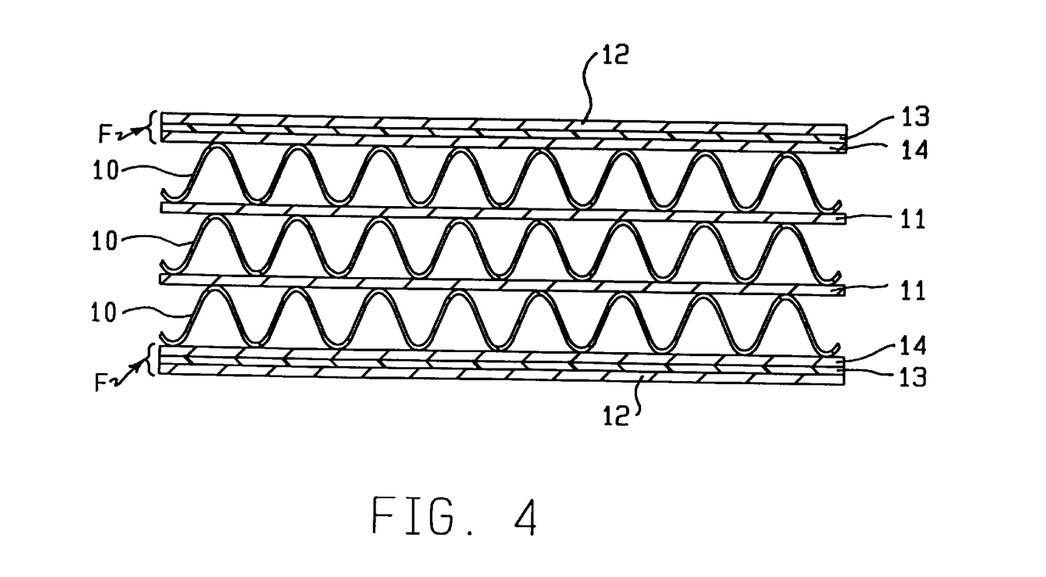
FIG. 4 is an end view of a wall of an extra-strong container having multiple layers of laminates and corrugated flutes.

In another embodiment of the container of this invention, the inner face liner of the container wall, which in FIG. 1 is a single ply of paper 11, may instead be formed of face liner laminate F, in which case both the interior and the exterior of the container are resistant to liquids. The addition of this inner face liner laminate also enhances the structural strength of the container made according to this embodiment. FIGS. 3 and 4 are partial views of two embodiments of container walls that may be formed using face liner laminate F for both the inner and the outer face liners.

Another container that can be formed in accordance with the embodiments illustrated in FIGS. 3 and 4 is an inexpensive, long term storage box. This box preferably has inner and outer face liners made of face liner laminate F, so that both inside and outside wall surfaces of the box are impermeable to liquids and fluids. The plastic film layer of laminate F may be, for example, mylar. Or, a transparent plastic film layer 12 may be laminated to a paper layer 14 that has a printed finish, such as a wood grain finish. In this arrangement, the box may be used as an inexpensive coffin. Alternatively, the container may be formed of corrugated paper board on which a high quality printed face board is protected by a transparent plastic film laminate layer. A partial sectional view of a wall of such a container resembles FIG. 2, wherein the high quality face board is represented by 14, which is adhesively laminated to plastic film laminate layer 12 with adhesive 13.

Structural rigidity and strength of such a container produced according to this invention may be enhanced in several ways. The fluted core of the corrugated board, for example, could have exceptionally large flutes, as illustrated in FIG. 3. Face liner laminate F is used to form both inner and outer face liners of the corrugated medium, so that the inner and outer walls of the resulting product are impermeable. When face liner laminate F is used in this way, it is oriented so that the synthetic film ply 12 forms the exposed surface of both outer and inner face liners.

Alternatively, multiple corrugations may be layered between the inner and outer face liners to add load bearing capacity to a coffin or other container according to this invention, as illustrated in FIG. 4. Face liner laminate F is used for both the inner and outer face liners so that the interior and exterior walls of a coffin or other container formed therefrom are impermeable. Synthetic film ply 12 forms the exposed surface of both outer and inner face liners. The corrugated medium is strengthened by stacking and adhering successive layers of fluted medium 10, each layer of which is separated by a paper layer of face liner 11. While three layers are shown in FIG. 4 for illustrative purposes, additional layers can be used for greater strength. Alternatively, additional strengthening can be provided by the use of face liner laminate F for both the interior and exterior surfaces of the container. The plastic laminated, corrugated medium described above and illustrated in FIGS. 3 and 4 may be used to form a variety of structural members, in addition to containers, that are inexpensive, yet strong, durable, light-weight, and water-resistant.

Figure 5:
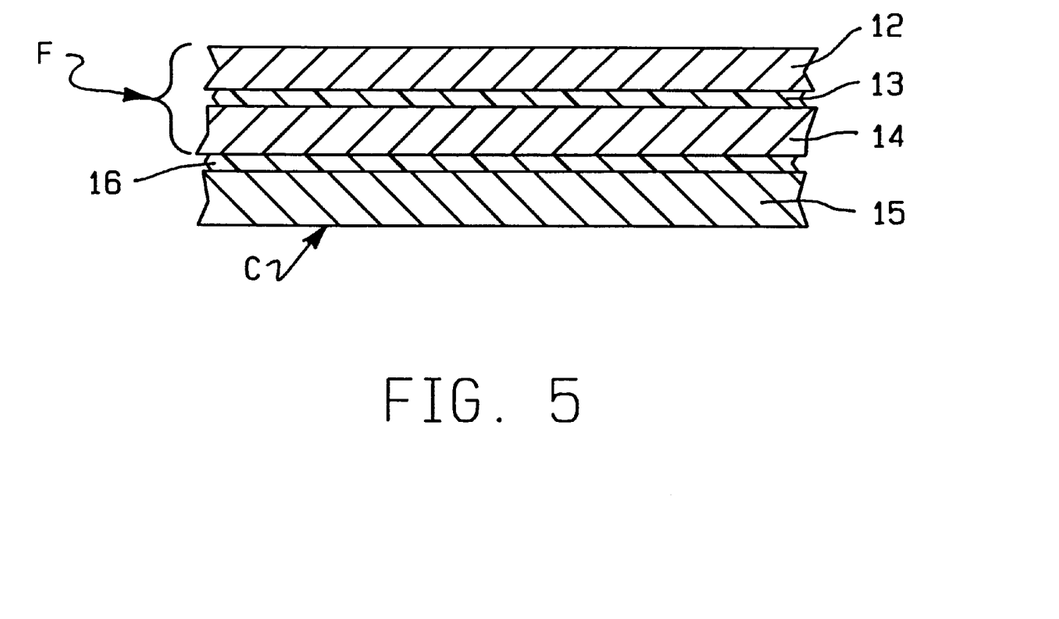
FIG. 5 is an end view of a wall of a cardboard container having a planar stiff paper core and an outer face liner formed of a laminate in accordance with the invention.

Another embodiment of this invention is a container that is formed of cardboard C having a planar stiff paper core 15, instead of corrugated paper board, as shown in FIG. 5. Face liner laminate F may be adhered to one or both surfaces of cardboard C: FIG. 5 shows the face liner laminate F adhered to an outer surface of cardboard C. Adhesive 16 joining the paper base ply 14 of laminate F to cardboard C is preferably a cold adhesive such as an acrylic. The container formed therefrom is stronger than a container made of conventional cardboard. Additionally, the exposed plastic ply of the cardboard container of this invention is impermeable to water but is wettable to printing inks. As in the case of the corrugated board, the exposed surface of planar stiff paper core 15 may have an inner face liner laminate adhered thereto, so that the core is then sandwiched between inner and outer face liner laminates to provide a cardboard of exceptional structural strength.

In practice, the laminate providing face liners for cardboard or corrugated paper board may include a plastic film ply that is metallized, as by vacuum deposition or sputtering to create a decorative silver-like or gold-like finish to containers produced from the board. Alternatively, the plastic film may be a pigmented film in any desired color. Furthermore, these decorative finishes can be provided on the outside or inside surfaces of the container, or on all surfaces, as desired.

Figure 6:
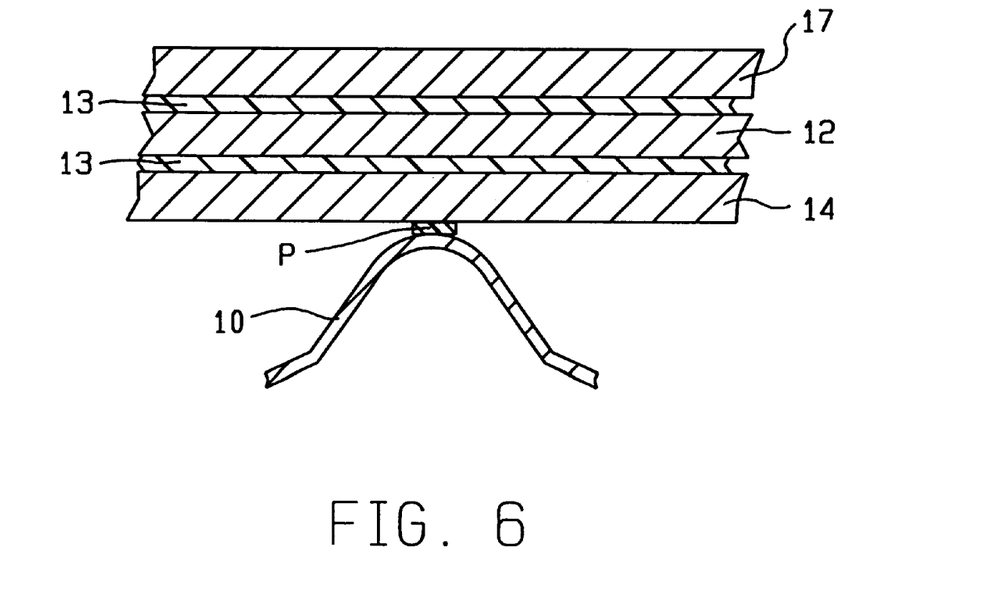
FIG. 6 is an end view of a portion of the wall of a corrugated container wherein a second paper layer is laminated to the top surface of the paper/plastic laminate.

The laminate covering the cardboard or corrugated paper board may also include a second paper layer 16 laminated to the outer surface of the synthetic film ply 12 as illustrated in FIG. 6 in a partial cross section. Second paper layer 17 is adhesively laminated with adhesive 13 to film ply 12, both of whose surfaces are treated in order to render them wettable, i.e., to facilitate adsorption of the adhesive onto the film surface. Although FIG. 6 illustrates a paper/plastic/paper laminate face liner adhesively attached to fluted paper core 10 of a corrugated board, the paper/plastic/paper laminate may also be adhered to one or both exposed surfaces of cardboard C having a planar stiff paper core.

Because the paper/plastic laminate of the invention is inexpensive, yet strong, durable and water resistant, inexpensive furniture items may also be manufactured from the paper/plastic laminate, either by itself or adhered to a supporting member. Accordingly, a further embodiment of this invention is a structural member for use in making various types of furniture made of a supporting member adhesively joined to cardboard or corrugated board which is covered with a paper/plastic laminate. The supporting member may be comprised of any of a variety of structural materials, such as particle board, sheet rock or other wall board.

Figure 7:
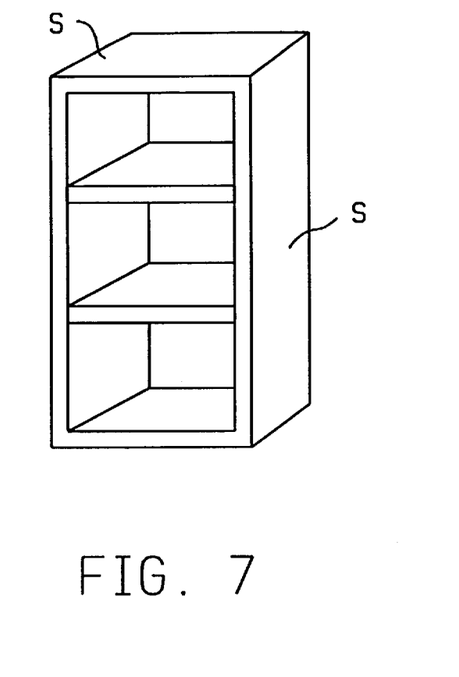
FIG. 7 is a perspective view of a furniture item fabricated of a laminated structural member in accordance with the invention.
Figure 8:
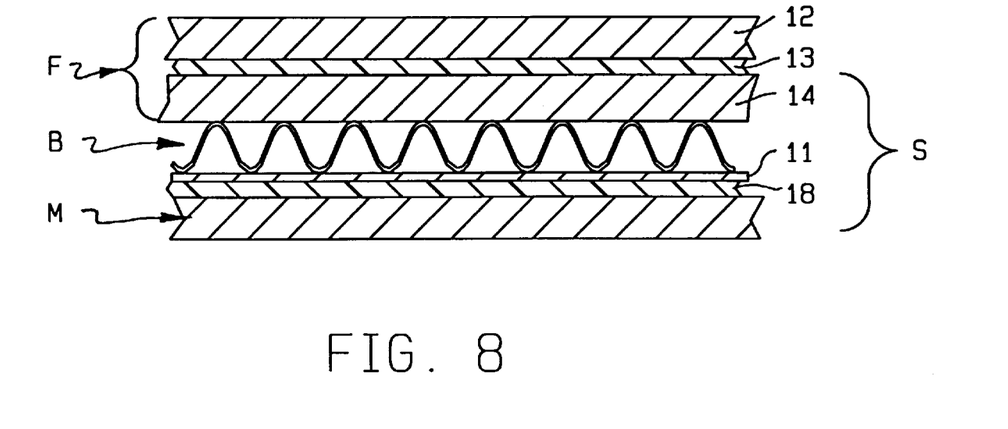
FIG. 8 is an end view of the laminated structural member used i the furniture of FIG. 7.

FIG. 7 is a perspective view of a sample furniture item that may be constructed from structural member S which comprises a supporting member and a laminate. A partial sectional view of structural member S is illustrated in FIG. 8, where face liner laminate F is adhered to a cardboard layer formed by corrugated board B having inner face liner 11. Inner face liner 11 is adhered to supporting member M, which is a structural material such as particle board. This construction can also be used to form the shelves which are provided and installed in conventional manners. A water-based adhesive 18 may be used to laminate the cardboard layer to the supporting member. Although FIG. 8 shows the cardboard layer as corrugated board B, an alternative is to use cardboard having a planar stiff paper core instead.

As a consequence of the flexibility in production that this invention offers, instead of forming conventional cardboard or corrugated paper board products whose appearance is strictly utilitarian, one may produce what could be called a designer container or other structural item that is visually appealing and exceptionally strong and durable. The method of making such items as disclosed herein is more cost-efficient and produces a higher quality finished product than prior art methods of applying decorative graphics and plastic films to corrugated paper board or cardboard. Additionally, the methods disclosed herein overcome the technical problems previously encountered in the production of cardboard or corrugated paper board on which plastic laminates are adhered.

The Manufacturing System:

As pointed out in the Lang patent, conventional corrugated board is produced in a manufacturing system in which a single face paper liner web is combined with a fluted paper core web in a single facer unit which yields a corrugated web that is adhered in a double backer glue machine to a double face liner. Thus, emerging from this machine is a web of corrugated board in which the fluted core is sandwiched between inner and outer paper face liners.

Unlike prior art systems, the present invention is capable of applying a paper/plastic face liner laminate to the cardboard core in a step that is integral with the corrugator line, without the problems of slippage and shrinkage of the plastic film ply that have been encountered in the prior art. Additionally, containers manufactured according to the present invention have walls that are impermeable, have enhanced structural rigidity and resistance to gouging, are receptive to printing inks and may be decoratively printed.

Figure 9:
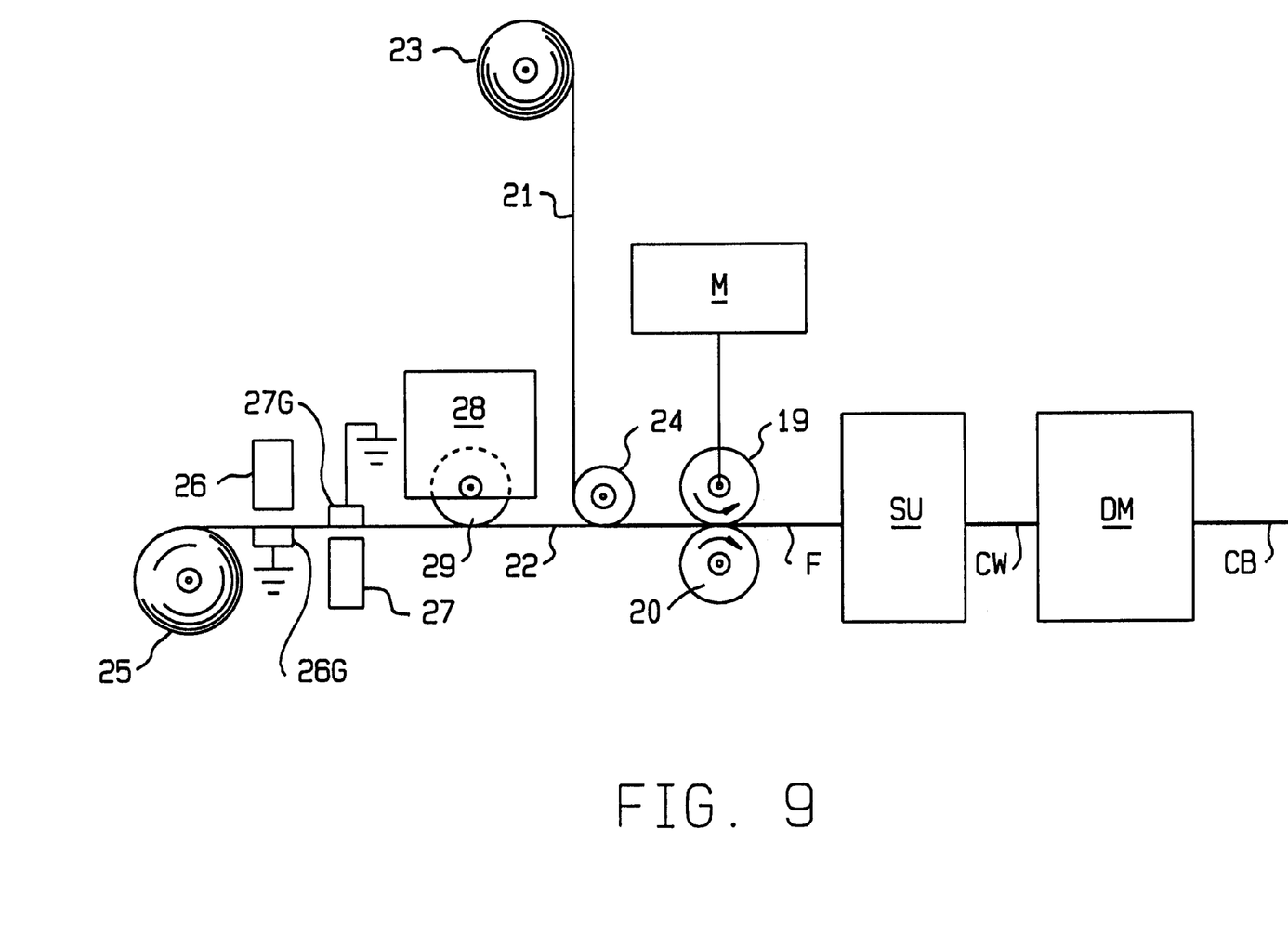
FIG. 9 schematically shows a system for manufacturing a corrugated board in accordance with the invention.

The invention disclosed herein preferably uses a system as illustrated in FIG. 9: a laminate web F which is combined with a fluted web is fed into a single facer unit SU to yield a corrugated web CW. This corrugated web is then fed into a double backer machine DM in which it is adhesively combined with a paper face liner web to yield a web of corrugated board in which the fluted core is sandwiched between a laminate outer face liner F and a paper inner liner.

Laminate web F may be produced in a laminator machine as shown in FIG. 9 that includes a combining station having a pair of cooperating pressure rolls 19 and 20, driven at high speed by a motor M. The nip between these rolls is appropriate to the thickness of the webs to be laminated to provide the desired degree of laminating pressure to ensure secure bonding of the webs.

Fed concurrently into the nip of rolls 19 and 20 at the combining station are a web 21 of paper for forming the paper ply 14 of the laminate F, and a web 22 of synthetic, plastic film material to form the film ply 12 of the laminate. Web 21 is drawn from a paper supply reel 23 supported at an elevated position. Paper web 21 is drawn downwardly from this reel and is guided by an idler roll 24 into a horizontal path leading into the nip of the combining rolls.

Film web 22 is drawn from a film supply reel 25 which is placed at a position to feed film web 22 directly into a horizontal path toward the nip of the combining rolls. Reel 25 is placed well in advance of the combining station in order to expose a fairly long stretch of film web before it enters the combining rolls.

Along this stretch of biaxially-oriented film web 22 formed of a synthetic plastic film material such as polypropylene having a high dielectric constant, is a first corona discharge electrode 26 which is spaced above the upper surface of the film to create an ionizable air gap therebetween. The film web runs along a ground electrode 26G in vertical alignment with discharge electrode 26. The corona discharge, which is directed toward the upper surface of the film web, increases the surface energy at the web surface to render it wettable and, therefore, receptive to adhesives, but it does not affect the molecular orientation of the film.

Also along the stretch of film following the first corona discharge station 26–26G is a second corona discharge station for subjecting the undersurface of film web 22 to a corona discharge to render this surface wettable. The second station consists of a corona discharge electrode 27 which is spaced from the undersurface of web 22 to create an air gap therebetween, and a cooperating ground electrode 27G engaging the upper surface of the web.

Intermediate the second corona discharge station 27–27G and the combining station is an adhesive applicator 28 having a coating roll 29 which engages the now wettable upper surface of film web 22 and applies thereto the water-based, polyvinyl acetate modified copolymer adhesive for laminating the film web to the paper web to form the laminating adhesive layer 13 of the laminate web F.

Thus concurrently entering the nip of pressure rolls 19 and 20 of the combining station at ambient temperature are paper web 21 and the adhesive-coated plastic web 22. These webs are subjected to pressure by pressure rolls 19 and 20, cold-lamination being effected by this action. The laminated webs from the combining station form the laminate web F which is fed into the single face unit SU in which a web of paper is corrugated to produce a fluted core that is adhesively combined with laminate web F to yield a corrugated web. This corrugated web CW is fed into the double facer glue machine DM. Coming out of this machine is a web CB of corrugated board whose fluted core is sandwiched between laminate web F forming the outer face liner of the board and a paper web forming the inner face liner thereof.

In another embodiment of the invention, laminate web F is fabricated as described herein, except that it is manufactured separately from the corrugator line. This embodiment enables the laminate web to be introduced into the line at the single face unit SU, where laminate web F is adhesively combined with a fluted core to yield a corrugated web CW. From that point, the method of manufacture continues as described previously, i.e., the web proceeds into the double facer glue machine DM in order to have a second face liner adhesively applied to the opposite side of the fluted core.

Alternatively, instead of using corrugated board, cardboard having a planar stiff paper core may be laminated to laminate web F. In manufacturing cardboard with at least one laminate face liner, laminate web F may be formed in the input laminator machine section of the system shown in FIG. 9, or web F may be formed separately. Either way, the laminate web F is fed into a laminator where it is adhesively combined with a pressed paper web forming the planar core of the cardboard.

Modifications to the Manufacturing System:

In the system to manufacture corrugated board shown in FIG. 9, the corona-discharge treated oriented film web 22 is first laminated to a Kraft paper web 21 to form an outer face liner whose paper side is then joined to one side of a fluted paper core. The opposite side of the fluted paper core is adhered to a paper web forming the inner face liner of the board.

As described above, this system differs from the prior art in that the preferred embodiment of this invention is capable of successfully laminating an outer face liner having a plastic film layer to the fluted core of corrugated board as an integral part of the corrugation line, whereas prior art methods use separate, off-line laminating steps or else laminate the plastic film layer after the corrugated paper board is fully formed.

A great deal of flexibility in the manufacture of containers and structural members as disclosed herein is achieved as a result of the successful lamination of paper/plastic film layers to the fluted paper core in the corrugation line. Several alternative embodiments of the manufacturing system are described below.

One alternative to the method described above is to produce first a web of corrugated board in which a fluted paper core is sandwiched between paper inner and outer face liners, and then laminate to the outer face paper liner a treated web of oriented film. For this purpose, one may use a conventional laminator system for producing a web of corrugated board, the output of this system being fed to a laminator for cold-laminating a corona-discharge treated film web to the outer face paper liner of the corrugated board web.

Alternatively, if cardboard is to be produced instead of corrugated board, a conventional system may be used to manufacture a cardboard web having a pressed paper core sandwiched between paper face liners. A treated film web may then be cold-laminated to one of the paper face liners to reinforce the cardboard.

Additionally, in the manufacture of structural members for use in making furniture, one may first produce a cardboard or corrugated board web with an outer face liner formed of face liner laminate F, and then laminate the exposed cardboard surface to panels or sheets of a supporting material such as particle board, using a water-based adhesive.

The manufacturing system is also adapted for making containers whose surfaces are enhanced through the use of attractive finish materials. For example, one can laminate a corona-discharge treated web of transparent synthetic plastic film to a metallized paper web having a distinct color, such as bronze or silver. The metallized paper web is visible through the film, and together they form a face liner laminate F. The under side of the metallized paper layer is joined to one side of a fluted core to produce a corrugated board, or to one side of a pressed paper core to produce a cardboard. In both cases, a container formed thereby has an exterior surface with an attractive metallic appearance when the laminate F forms the outer face liner of the corrugated board or cardboard. The metallized face liner laminate F may also be adhered to the opposite surface of the cardboard or corrugated board, so that a container formed therefrom has an attractive interior.

It should be understood that variations and modifications within the spirit and scope of the invention, beyond those discussed herein, may occur to those skilled in the art to which the invention pertains. Accordingly, all expedient modifications readily attainable by one versed in the art from the disclosure set forth herein are to be included as further embodiments of the present invention. The scope of the present invention accordingly is to be defined as set forth in the appended claims.

What is claimed is:

1. A container having walls made of a paper/plastic laminate comprising:
    a first paper layer having first and second surfaces;
    an outer face liner comprising a plastic film having first and second surfaces, wherein the first surface of the plastic film is corona-discharge treated to render it wettable and receptive to adhesives, and the corona-discharge treated first surface of the plastic film is laminated to the first surface of the paper layer with a first water-based adhesive;
    a cardboard layer comprising at least one paper sheet, with the layer having first and second surfaces; and
    an adhesive on the second surface of the paper layer for joining the second surface of the paper layer to the second surface of the cardboard layer to form a laminate which imparts enhanced strength and water-resistance to the container walls.

2. The container of claim 1 wherein the cardboard layer comprises corrugated cardboard having a plurality of flutes attached to the first surface of the cardboard layer.

3. The container of claim 1, wherein the second surface of the plastic film is corona-discharge treated to render it wettable and receptive to inks, coatings and adhesives.

4. A container having walls made of a paper/plastic laminate comprising:
    a first paper layer having first and second surfaces;
    an outer face liner comprising a plastic film having first and second surfaces, wherein the first surface of the plastic film is corona-discharge treated to render it wettable and receptive to adhesives, the second surface of the plastic film is corona-discharge treated to render it wettable and receptive to inks, coatings and adhesives, and the corona-discharge treated first surface of the plastic film is laminated to the first surface of the paper layer with a first water-based adhesive;
    a cardboard layer comprising at least one paper sheet, with the layer having first and second surfaces;
    an adhesive on the second surface of the paper layer for joining the second surface of the paper layer to the second surface of the cardboard layer to form a laminate which imparts enhanced strength and water-resistance to the container walls; and
    a second paper layer having first and second surfaces, wherein the first surface of the second paper layer is adhesively joined to the corona-discharge treated second surface of the plastic film with a second water-based adhesive.

5. The container of claim 4, wherein the second surface of the second paper layer is metallized to enhance its appearance.

6. The container of claim 1, wherein the second surface of the plastic film forms an outer surface of the container.

7. The container of claim 1, wherein the second surface of the plastic film forms an inner surface of the container.

8. The container of claim 4, wherein the second surface of the second paper layer forms an outer surface of the container.

9. The container of claim 4, wherein the second surface of the second paper layer forms an inner surface of the container.

10. The container of claim 5, wherein the metallized second surface of the second paper layer forms an outer surface of the container.

11. The container of claim 5, wherein the metallized second surface of the second paper layer forms an inner surface of the container.

12. The container of claim 1 wherein the plastic film is an oriented synthetic plastic material to further enhance he strength of the laminate.

13. The container of claim 1 wherein the plastic film is polypropylene, nylon, or polyester.

14. The container of claim 1 wherein the first water-based adhesive comprises a polyvinyl acetate modified copolymer.

15. The container of claim 4 wherein the second water-based adhesive comprises a polyvinyl acetate modified copolymer.

16. A furniture structural member comprising a supporting member and a laminate comprising
    a first paper layer having first and second surfaces;
    an outer face layer comprising a plastic film having first and second surfaces, wherein the first surface of the plastic film is corona-discharge treated to render it wettable and receptive to adhesives, and the corona-discharge treated first surface of the plastic film is laminated to the first surface of the paper layer with a first water-based adhesive; and
    an adhesive on the second surface of the paper layer for joining that second surface to a surface of the supporting member,
    wherein the structural member is water-resistant and resists loss of bonding during loading.

17. The structural member of claim 16, wherein the supporting member is comprised of cardboard, particle board, sheet rock or wall board.

18. The structural member of claim 16, wherein the first water-based adhesive comprises a polyvinyl acetate modified copolymer.

19. The structural member of claim 16, wherein the plastic film is an oriented synthetic plastic material to further enhance the strength of the laminate.

20. The structural member of claim 16, wherein the plastic film is a polyester plastic film, the supporting member is comprised of particle board, sheet rock or wall board, and the first water-based adhesive comprises a polyvinyl acetate modified copolymer.

* * * * *